United States Patent [19]

Rhodes et al.

[11] Patent Number: 4,939,633
[45] Date of Patent: Jul. 3, 1990

[54] INVERTER POWER SUPPLY SYSTEM

[75] Inventors: Bruce R. Rhodes, Inverness; Dennis W. Jodlowski, Buffalo Grove, both of Ill.

[73] Assignee: General Signal Corporation, Stamford, Conn.

[21] Appl. No.: 306,595

[22] Filed: Feb. 3, 1989

[51] Int. Cl.$^5$ .............................................. H02M 7/00
[52] U.S. Cl. ...................................... 363/98; 363/41; 323/285
[58] Field of Search ........................ 363/17, 41, 78, 79, 363/97, 98, 131, 132; 323/275, 285, 356, 357

[56] References Cited

U.S. PATENT DOCUMENTS

| | | | |
|---|---|---|---|
| 4,124,885 | 11/1978 | Nordby | 363/96 X |
| 4,146,832 | 3/1979 | McConnell | 323/285 |
| 4,167,777 | 9/1979 | Allington | 363/79 X |
| 4,255,705 | 3/1981 | Milkovic | 323/357 X |
| 4,442,339 | 4/1984 | Mizuno et al. | 323/285 X |
| 4,739,464 | 4/1988 | Nishihiro et al. | 363/41 X |
| 4,808,906 | 2/1989 | Liepe | 323/285 X |

FOREIGN PATENT DOCUMENTS 0022490  2/1985  Japan ...................................... 363/41

OTHER PUBLICATIONS

"An Ideal Unit for a Modular Inverter", by M. A. Geyer and A. Kermick (CIRCA 1969).
"A 7 KW Inverter Using High Power Transistor", J. B. Brewster, IAS-Conference Record-1980, p. 708.
"A High Power Multitransistor Inverter Uninterruptible Power Supply System", Joachim Holly, Wolfgang Lotzkat, Karl-Heinz Werner, pp. 311-328, 1986, PESC Record.

Primary Examiner—Mark O. Budd
Assistant Examiner—Kristine Peckman
Attorney, Agent, or Firm—Martin LuKacher; Lee Waguespack

[57] ABSTRACT

An inverter power supply system (DC input, AC output) with a bridge type power stage having switching devices (transistors) in each arm is used to create an AC output voltage across the bridge center terminals. The transistors execute numerous switching cycles per period to create an output waveform that has a low frequency AC component together with a high frequency AC component that is removed via a low pass filter. Unless some means is provided to prevent it, a DC component is usually present at the output of the inverter as well. This DC component will cause saturation in transformer coupled loads with attendant excessive inverter device currents unless means are provided to limit or eliminate the DC component of the output voltage. To control the DC component of the output voltage, a magnetic sensing element is connected across the output terminals of the inverter and a voltage proportional to the DC component of the inverter output voltage is developed by measuring the difference between the positive and negative peaks of the current in the magnetic sensing element. The voltage proportional to the DC component of the inverter output voltage is applied to the control circuits creating the switching pattern for the inverter transistors in such a way as to eliminate the DC output voltage component.

6 Claims, 3 Drawing Sheets

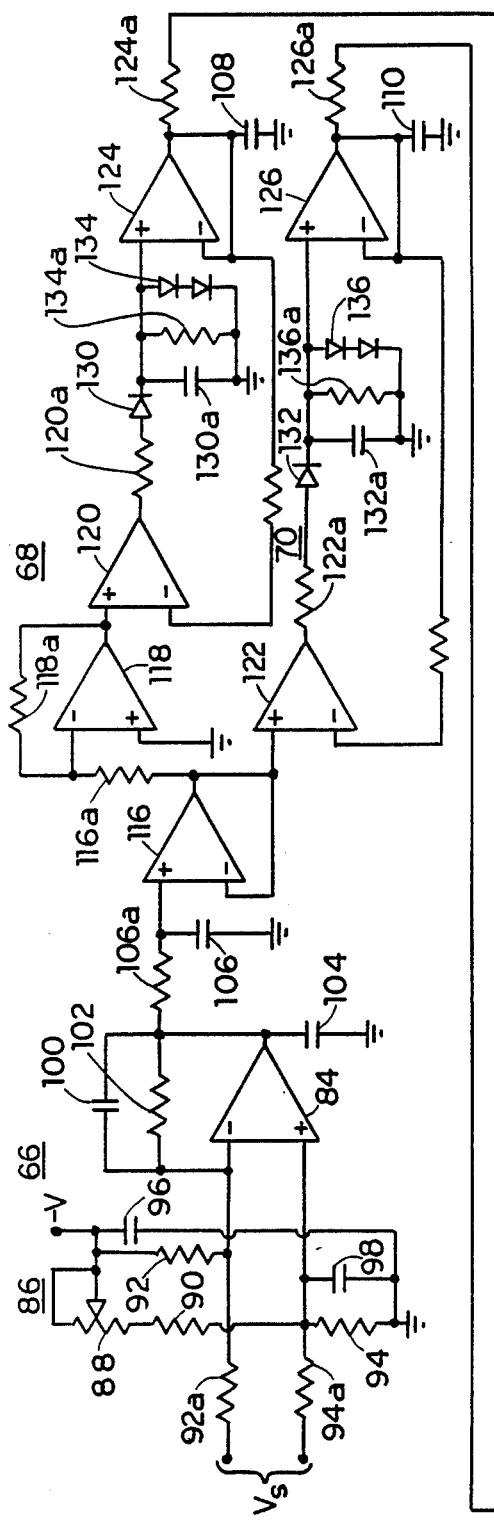
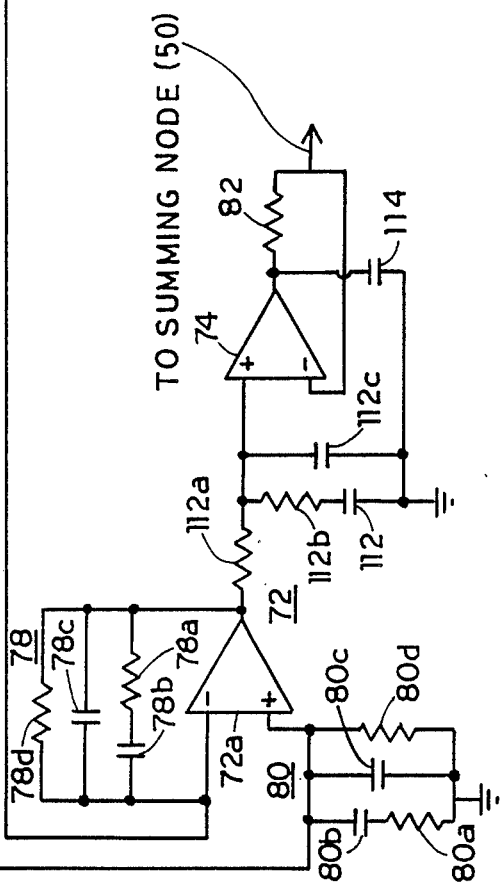
FIG. 3

INVERTER POWER SUPPLY SYSTEM

The present invention relates to inverter power supply systems, and more particularly to an inverter power supply system having DC offset correction capability so as to avoid saturation effects in magnetic components connected to the inverter output terminals.

The invention is especially suitable for use in power supplies which use batteries to back up and provide power when outages occur in the public utility power source. Such battery backup is necessary when critical equipment must be protected against blackouts; for example, life support equipment and computer equipment. Such power supplies are known as uninterruptible power supplies (UPS) and also as standby power sources (SPS).

UPS inverter power supplies convert a DC source, such as a battery, into an AC output at the usual power line voltage and frequency which in the United States is 60 Hz and 120 Volts rms. The AC output is obtained by switching the DC across the load in alternate directions via switching devices, usually transistors. In many inverter power supplies, the switches are programmed to execute numerous switching cycles per second. Such power supplies are called pulse-width-modulated (PWM) inverters since they create or synthesize the AC output as an approximate sinewave by varying the width of the multiple pulse sequence in a sinusoidal manner. PWM inverters are common in many types of equipment, in addition to UPS such as motor drives, AC power sources, and portable power systems.

In any inverter a DC component or offset can be developed in the output voltage waveform. This offset voltage may be caused by a number of factors and the following list should not be taken as inclusive: switching device timing errors, saturation voltage mismatches, control circuit offsets, control circuit drifts and impedance unbalances. When a DC voltage is applied to a magnetic element such as a transformer or motor winding, magnetic saturation occurs and will result in excessive current through the inverter switching devices which can lead to their failure. Even if the devices are not destroyed, saturation also causes distortion of the AC output waveform and inefficiency due to increased losses in the inverter.

A common solution to the offset voltage and saturation problem is to add a transformer connected to the output of the inverter and design the transformer with the capability to handle some amount of DC voltage without saturating. This is typically done via a gap in the transformer and operating the transformer at lower flux levels. A drawback to this approach is the resultant increase in transformer magnetizing current which must be supplied by the inverter to excite (cause magnetic flux in) the transformer. This excess current increases losses in the inverter and therefore decreases efficiency. Reducing the flux level of the transformer also causes the transformer to be larger, heavier, and more expensive than would have otherwise have been necessary. An additional disadvantage is that the inverter devices have to be sized to handle the additional magnetizing current as well. Other approaches to the offset voltage problem are discussed in an article published about the time of the Apollo program (later 1960's) in an article entitled, "An Ideal Unit For a Modular Inverter" by M. A. Gayer and A. Kermick. Other articles and texts which are relevant to PWM inverters and the problems which are faced and solved by this invention are as follows: "A 7 KW Inverter Using High Power Transistor", J. B. Brewster, IAS—Conference Record—1980 p. 708; and "A High Power Multitransistor-Inverter Uninterruptible Power Supply System" Joachim Hollz, Wolfgang Lotzkat, and Karl-Heinz Werner, 1986 PESC Record, p. 311-320.

It has been discovered in accordance with the invention and is shown in FIG. 2 of the accompanying drawings that if a DC offset is present, the peaks of the resulting magnetizing current (ImagG) change dramatically resulting in unequal current peaks. By detecting the difference in voltage corresponding to these current peaks, an error signal which is related to the DC offset can be obtained. This error signal may be used to provide a correction signal (via negative feedback) to the PWM inverter control circuits (the PWM logic in the case of a PWM inverter).

Accordingly, it is the principal object of the present invention to provide improved inverter power supply systems.

It is another object of the invention to provide improved inverter power supply systems wherein DC offsets in the output voltage of an inverter power stage may be compensated and corrected thereby counteracting saturation effects in any magnetic loads that may be connected to the inverter power supply.

It is a still further object of the present invention to provide improved PWM inverters.

In an inverter power supply system embodying the invention has or may have a magnetic type load (such as a transformer or motor) in which a minimum (ideally zero) DC output voltage component is desired. Means are provided for sensing the inverter output voltage with a magnetic element and deriving a voltage proportional to the current in this magnetic element. Means are provided for detecting the difference between the positive and negative peak amplitudes of this derived voltage. Finally, means are provided for controlling the inverter switching sequence to reduce the difference between the positive and negative going peaks and thereby to eliminate DC offsets in the inverter output voltage.

The foregoing and other objects, features and advantages of the invention will become more apparent from a reading of the following description in connection with the accompanying drawings in which:

FIG. 3 is a schematic diagram illustrating the DC offset correction circuits depicted in FIG. 1.

Figure 1:
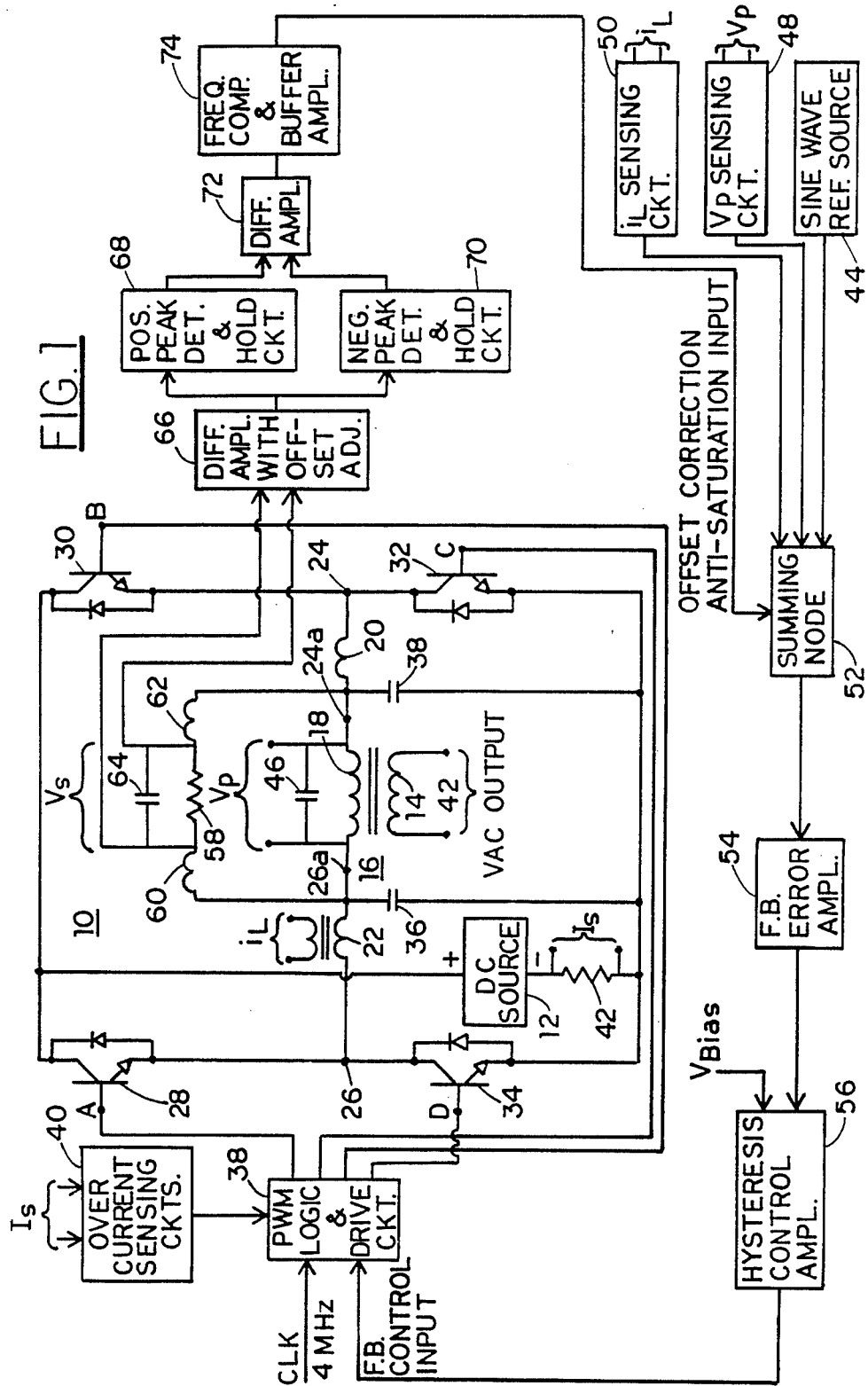
FIG. 1 is a diagram, partially in block and partially in schematic form, showing a PWM inverter embodying the invention.

Referring first to FIG. 1, there is shown an inverter power stage which converts direct current energy from a DC source, such as a battery, into an AC voltage at the inverter output terminals 24a and 26a. An output transformer across the inverter output terminals 24a and 26a provides the magnetic output element. An AC output voltage is derived across the secondary 14 of the output transformer 16. The primary winding 18 of the transformer is connected to the mid points of the bridge arms 24 and 26 through inductors 20 and 22. The bridge has four arms, each with a switching device in the form of a switching transistor 28, 30, 32, and 34. These transistors may be bridged (between their collectors and emitters) by diodes which circulate reactive currents back through the DC power source 12. Inductors or chokes 20 and 22 together with capacitors 36, 38, and 46 as well as the leakage inductance of the transformer 16 and the inductances and capacitances of the other components connected thereto which will be discussed in detail below and which may have additional purposes, form a filter which attenuates the high frequency switching components present in the circuit due to the PWM switching pulses which are applied to the base terminals A, B, C, D of the switching transistors 28, 30, 32, and 34. A suitable cutoff (3 db frequency) of this filter is 2 KHz.

The switching pulses are generated by pulse width modulator logic (PWM) and drive circuits 38. The PWM drive signals are then applied to the base terminals A, B, C, and D of the power switching transistors 28, 30, 32 and 34. The PWM logic may be a gate array of the type which is fabricated as an integrated circuit chip by conventional and available techniques, and which generates, from clock pulses (suitably at 4 MHz), the sequences of pulses of varying duration. These pulses switch the current from the DC source 12 to provide staircases (in waveform) of current through the primary winding 18 of the transformer 16 to develop the AC output at the desired frequency and voltage (e.g., 60 Hz and 120 VAC RMS). The PWM frequency in the illustrated system, may vary between 9 KHz and 30 KHz. The design of the logic and drive circuits 38 is conventional and has been used in PWM converters heretofore, for example the "Mini UPS" models 400, 600, and 750 which are available from Sola Electric, a Unit of General Signal Corp., 1717 Busse Road, Elk Grove Village, Ill. 60007 (U.S.A.).

Over current sensing circuits 40 respond to the inverter bridge current ($I_s$), which passes through a sensing resistor 42 connected in the negative return to the DC energy source 12. The PWM logic circuits 38 respond to this signal by limiting the maximum amplitude of the current pulses passing through the transformer primary 18 so as to reduce the AC output voltage under overload conditions.

The control signal may be obtained by summing together, at the indicated summing node 52, the following signals:

1. A low distortion reference sine wave of the desired frequency and amplitude from a reference source 44.
2. A properly scaled output voltage signal ($V_p$), in this case obtained from the primary voltage $V_p$ of the transformer 16.
3. A voltage iL representing the bridge current flowing through the transformer 16 primary.
4. A DC offset correctional signal from the offset sensing circuitry.

The error signal derived at the summing node 52 is then applied to a hysteresis control amplifier (comparator circuit) 56 via a feedback error amplifier 54. The error signal when compared to the reference, $V_{bias}$, generates the feedback control signal into the control input of the PWM logic and drive circuitry 38. This control signal varies the timing (pulse duration) of the PWM pulses which are applied to the bases A, B, C, and D of the power switching devices 28, 30, 32, and 34, so as to control the wave form and amplitude of the AC output voltage.

The voltage $V_p$ is obtained from the primary voltage 18 of the output transformer 14. An additional capacitor 46, for high frequency filtering, is connected across the primary 18. The voltage $V_p$, is conditioned by a sensing circuit 48, which may include a common mode differential amplifier with input and feedback filtering (across an operational amplifier providing the differential amplifier) which filters (blocks) the high frequency (greater than 30 KHz) switching spectrum. The bridge current signal $i_L$, is tapped from a few turns wound around the core of choke 22. An $i_L$ sensing circuit 50, which may contain an integrating operational amplifier, provides the $i_L$ component to the summing node 52 of the feedback error amplifier 54. The amplifiers 54 and 56 have associated therewith filter circuits for preventing the passage of the high frequency switching signals and harmonics thereof to the feedback control input of the PWM logic and drive circuits 38.

Figure 2:
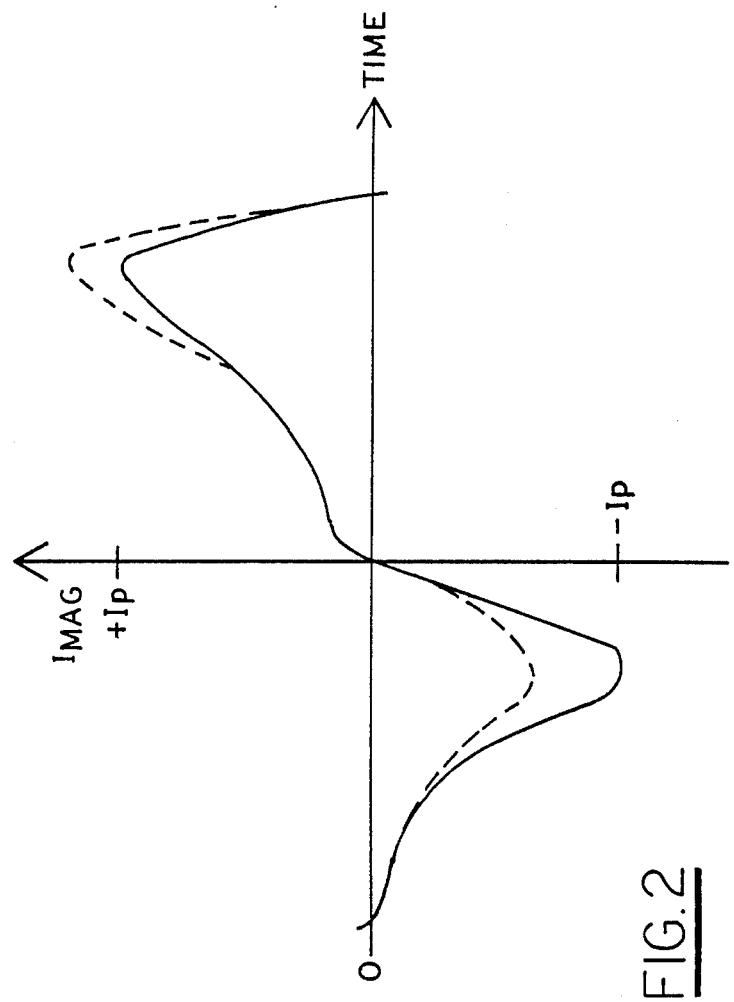
FIG. 2 is a typical wave form of the magnetizing current in the transformer 18 of the power stage of the inverter shown in FIG. 1 which illustrates the effect of a DC offset voltage present at the output terminals of the inverter.

As discussed above, inverter circuits and particularly bridge inverter circuit topologies, develop an average (DC) offset voltage at the center bridge terminals 24a and 26a which, unless counteracted, will cause saturation effects in a transformer or any other electromagnetic element which is connected across the terminals 24a and 26a. When the current is normal and balanced, the solid wave form (see FIG. 2) occurs, approximating the primary magnetizing current wave form of a transformer connected between the inverter terminals 24a and 26a. It was discovered in accordance with the invention that when the offset voltage occurs, the transformer magnetizing current becomes unbalanced. In other words, the peaks of the magnetizing current ($+Ip$ and $-Ip$) waveform will be unequal due to saturation effects. In FIG. 2 the positive peak $+Ip$ (as shown on the dash line curve) is noticeably higher than the negative peak. This effect is used, in accordance with the invention, to obtain an offset anti-saturation correction signal input to the summing node 52. This signal is then applied as part of the error signal, to the feedback error amplifier 54 and hystersis control comparator/amplifier 56 to the control input of the logic 38 (FIG. 1) for feedback control of the PWM drive signal. Such control returns the magnetizing current wave form to the desired waveform as is obtained when no offset bias is present across the terminals 24A and 26A (i.e., peaks, $+Ip$ and $-Ip$, equal).

An average offset voltage correction signal is established by sensing means operative for first sensing the magnetizing current. The sensing means is a network consisting of balanced chokes 60 and 62 and a current sensing resistor 58 shunted by a high frequency filtering and wave shaping capacitor 64. This network is connected across the output terminals of the inverter bridge 24a and 26a. The balanced chokes 60 and 62 may be any magnetic element whose magnetizing current can be used to establish such a signal as to detect the peak unbalance as mentioned previously. Two primary windings of a transformer with its secondary left open may be used for the chokes 60 and 62. The magnetizing current is converted to a voltage by resistor 58 and the sensed voltage ($V_s$) is applied to the inputs of a differential amplifier circuit 66.

This differential amplifier circuit 66, as is shown in greater detail in FIG. 3, is provided with an offset bias control circuit 86, which is used to set up the zero offset reference condition on initial and any subsequent adjustment during maintenance of the system. The differential amplifier inputs are protected against excessive common voltages by the voltage divider configuration of resistors 88, 90, 92, 94, 92a and 94a. Differential signal gain is maintained at unity (1) over the frequency spectrum of the desired magnetizing current signal $V_s$. Capacitors 96, 98, 100 and 104 provide high frequency filtering of the $V_s$ signal. Operational amplifier 84 is a low DC offset and temperature drift device to insure an accurate signal representation to the next processing stages. $V_s$ is applied to balanced inputs of the operational amplifier 84 of the difference amplifier 66. Bias control and input common mode voltage limiting are provided for by the resistors in circuit 86. Capacitors 96, 98, and 100 provide high frequency filtering and signal attentuation of the switching signals and harmonics thereof which may be present at the inputs of the operational amplifier 84. The capacitor and resistor network 104, 106, and 106a as well as other capacitors located throughout the system 106 through 114, also remove high frequency components which be introduced into the feedback control signal path.

The output of the input differential amplifier circuit 66 is applied to phase splitting amplifiers 116 and 118 via a low pass filter configuration ($f_o = 1.6$ KH$_3$), (where $f_o$ is the 3 db cutoff) of resistor 106a and capacitor 106. Amplifiers 116 and 118 are preferably of the complimentary type, such as dual amplifiers, which are contained on the same circuit chip so as to reduce temperature drifts and offset errors in the conditioned error signal presented to the summing junction 52. Amplifiers 116 and 118 are respectively configured for unity gain non-inverting and unity gain inverting by resistors 116a and 118a. The operation of the phase splitting circuits presents positive, phase split waveforms to the inputs of individual peak detector and hold circuits 68 and 70.

The peak detector and hold circuits 68 and 70 are composed of discrete components, i.e. individual resistors, capacitors, as shown in FIG. 3, or amplifier integrated circuit packages. Other circuits configurations and application of state of the art integrated circuits may be used by those skilled in the art to design such circuits. Effectively, the phase split signals are coupled to these similar peak detect and hold circuits 68 and 70. One circuit 68 captures and holds the positive peak of the $V_s$ signal, while the other circuit 70 captures the negative (now inverted to positive by the amplifier 118) $V_s$ peak signal.

Another differential amplifier circuit 72 detects the difference in the peak amplitude signals held by detector circuits 68 and 70. Preferably, these circuits 68 and 70 are complimentary in nature, and contain quad operational amplifiers 120, 122, 124, 126 (FIG. 3) which are contained in the same circuit chip so as to reduce temperature drifts and offset errors in the signal applied to the error amplifier summing junction 52.

Small signal diodes 134 and 136 are used to clamp the maximum peak transitions in the positive and negative peak detectors to prevent overshoot of the error signal which is developed by the DC offset sensing circuits. Resistors 134a and 136a, in their respective circuits, discharge their respective hold capacitors 130a and 132a at a fixed rate so that the DC offset correction loop can respond to and correct a transient condition, which may be due to a change in the load at the output terminals 24a and 26a that may alter the steady state characteristics of the overall DC offset correction system. Resistors 120a and 122a limit the rate of rise of the peak hold capacitor voltage while buffering the individual amplifiers 120 and 122 from the large capacitive loading effects of these peak hold capacitors 130a and 132a.

The $V_s$ wave form peak signals conditioned by the peak hold and detection circuits 68 and 70 are applied to the differential amplifier circuit 72. The differential amplifier 72 then compares the two input signals and derives an error signal. The passive resistor, capacitor networks 78 and 80 provide both transient and steady state signal amplification to the error signal from the differential amplifier 72, while rejecting undesired high frequency noise signals. Transient error signal gain is set by the passive components 110, 80a and 80b at the positive (direct) input to the amplifier 72a, while passive components 108, 78a and 78b do the same at the negative (inverting) input to 72. Steady state gain and high frequency noise rejection at the input terminals of amplifier 72a is set by the passive components 110, 80c, and 80d at the positive input, and 108, 78c and 78d at the negative input to amplifier 72A. Amplifier 72a is of the low DC offset and low temperature drift type. As can be observed from the overall circuit shown in FIG. 3, amplifier section 72 provides a significant portion of the offset sensing circuit gain (amplification), and also minimizes errors that may be introduced by temperature drifts in the circuits following the differential amplifier stage 72.

This error signal is now passed through a frequency compensation network consisting of resistors 112a, 112b and capacitors 112 and 112c to a buffer amplifier stage 74. A precision resistor 82 and its parallel capacitor 114 are connected to the output of the buffer amplifier 74. These and the previously mentioned frequency compensation components form a lag type network which provides loop stability over the entire load range that may be applied to the output terminals of the inverter 24a and 26a. This network also prevents system oscillation upon initial startup of the inverter system. The output of the buffer amplifier 74 is attenuated by the precision resistor 82 which sets the amplitude of the offset correctional signal at the mode 52 of the error amplifier 54. Capacitor 114 contributes to the transient response of the overall offset correction network shown in FIG. 3.

In FIG. 3 the terminals and circuits for applying operating voltage to all of the operational amplifiers are conventional and are not shown in order to simplify the illustration.

From the foregoing description it will be apparent that there has been provided improved inverter power supply systems. While these systems are especially suitable for use as SPS and UPS systems, other applications thereof will undoubtedly become apparent to those skilled in the art. Moreover, while the system has been described in its presently preferred embodiment as a PWM inverter, the invention may also be applicable to other types of inverters with other controls and in other configurations, as well as the full bridge shown, such as half bridge, center tapped load and in three phase configurations. The foregoing and other variations and modifications, within the scope of the invention, will undoubtedly suggest themselves to those skilled in the art. Accordingly, the foregoing description should be taken as illustrative and not in a limiting sense.

We claim:

1. In an inverter power supply system having means which converts DC into an AC output, the improvement comprising means including a magnetic element and a resistor through which magnetizing current in said magnetic element flows for sensing and providing across said resistor a voltage signal corresponding to said AC output, means for detecting the difference between the positive and negative going peak amplitudes of said voltage signal, means for controlling said converting means to reduce said difference thereby reducing any DC component of said AC output, an output element having a winding across which said AC output appears, said power stage containing a bridge circuit with four arms, switching devices connected in each of said four arms, said output element being connected across junctions between opposite pairs of said arms said converting means comprising pulse generating means for converting means switching devices at a frequency much higher than the frequency of said AC output, said sensing and peak amplitude difference detecting means being connected in feedback relationship with said pulse generating means for controlling the timing of pulses to provide said DC component reduction, said pulse generating means comprising means operated by repetitive pulses of frequency much higher than the frequency of said AC output for providing sequences of pulses of different widths to said switching devices, said means for providing said pulses of different widths having a pulse width control input to which said sensing and peak amplitude difference detecting means are connected in said feedback relationship, means including said sensing and peak amplitude difference detecting means for providing in response to said signal across said resistor a first control signal for correcting said DC component, means responsive to said AC output and to a reference source of sine waves for providing second and third control signals, respectively, and means for applying said first, second and third control signals to said pulse width control input.

2. The system according to claim 1 wherein said winding is a primary winding of an output transformer, said transformer having a second winding across which said AC output appears, means for sensing the inductive current through said primary winding for providing a fourth control signal, said applying means comprising a feedback error signal amplifier to which the sum of said first, second, third and fourth control signals are applied, and hystersis comparator through which said feedback amplifier is connected to said pulse width control input.

3. In an inverter power supply system having means which converts DC into an AC output, the improvement comprising means including a magnetic element and a resistor through which magnetizing current in said magnetic element flows for sensing and providing across said resistor a voltage signal corresponding to said AC output, means for detecting the difference between the positive and negative going peak amplitudes of said voltage signal, means for controlling said converting means to reduce said difference thereby reducing any DC component of said AC output, said means which converts DC has output terminals across which said AC output is provided, said resistor being connected across said output terminals through said magnetic element, a first difference amplifier having its input connected across said resistor, biasing means connected to said difference amplifier for providing said signal with a predetermined DC offset, said peak amplitude difference detecting means comprising first and second peak detecting and holding circuits respectively responsive to the positive and negative peaks of said signal, and a second difference amplifier having a pair of inputs to which said first and second peak detecting and holding circuits are respectively connected which derives an error signal corresponding to said peak amplitude difference at the output thereof, and further comprising frequency compensating circuits for passing the spectrum of said error signal up to the frequency range of said AC output and connected to said second difference amplifier.

4. The system according to claim 3 further comprising an output element having a winding across which said AC output appears, said converting means being a power stage which contains a bridge circuit with four arms, switching devices connected in each of said arms, said output element being connected across junctions between opposite pairs of said arms, said converting means comprising pulse generating means for operating said switching devices at a frequency much higher than said AC output, said sensing and peak amplitude difference detecting means being connected in feedback relationship with said pulse generating means for controlling the timing of pulses to provide said DC component reduction, and further comprising a buffer amplifier for applying said error signal to said pulse generating means.

5. The system according to claim 4 further comprising means connected to said first difference amplifier and said peak detecting circuits for preventing the passage of said much higher frequency to said controlling means.

6. In an inverter power supply system having means which converts DC into an AC output, the improvement comprising means including a magnetic element and a resistor through which magnetizing current in said magnetic element flows for sensing and providing across said resistor a voltage signal corresponding to said AC output, means for detecting the difference between the positive and negative going peak amplitudes of said voltage signal, means for controlling said converting means to reduce said difference thereby reducing any DC component of said AC output, said sensing means comprising a pair of coils which provide said magnetic element, said pair of coils being connected in series and in balanced relationship with said resistor across which said signal is provided.

* * * * *